US009654995B2

(12) United States Patent
Huang et al.

(10) Patent No.: US 9,654,995 B2
(45) Date of Patent: May 16, 2017

(54) METHOD, DEVICE, AND SYSTEMS FOR MANAGING ACCESS POINTS CONTROLLED BY AN ACCESS POINT CONTROLLER (71) Applicant: CHENGDU SKSPRUCE TECHNOLOGY, INC., Sichuan (CN)

(72) Inventors: Kaidi Huang, Chengdu (CN); Yongcheng Lei, Chengdu (CN); Jiangang Ding, Chengdu (CN); Jingli Chi, Chengdu (CN)

(73) Assignee: CHENGDU SKSPRUCE TECHNOLOGY, INC, Chengdu, Sichuan (CN)

( * ) Notice: Subject to any disclaimer, the term of this patent is extended or adjusted under 35 U.S.C. 154(b) by 14 days.

(21) Appl. No.: 14/421,076

(22) PCT Filed: May 4, 2014

(86) PCT No.: PCT/CN2014/076705
§ 371 (c)(1),
(2) Date: Feb. 11, 2015

(87) PCT Pub. No.: WO2015/139359
PCT Pub. Date: Sep. 24, 2015

(65) Prior Publication Data
US 2016/0262031 A1    Sep. 8, 2016

(30) Foreign Application Priority Data
Mar. 19, 2014    (CN) .......................... 2014 1 0101877

(51) Int. Cl.
*H04L 12/28*    (2006.01)
*H04W 24/04*    (2009.01)
*H04L 12/24*    (2006.01)

(52) U.S. Cl.
CPC ............. *H04W 24/04* (2013.01); *H04L 12/24* (2013.01); *H04L 41/0681* (2013.01); *H04L 41/0816* (2013.01)

(58) Field of Classification Search
CPC ............... H04W 24/04; H04L 41/0681; H04L 41/0816; H04L 12/24
See application file for complete search history.

(56) References Cited

U.S. PATENT DOCUMENTS

2009/0086689 A1*  4/2009  Hunt ...................... H04W 28/06
                                                              370/338
2010/0202422 A1*  8/2010  Govindan ............. H04W 88/04
                                                              370/338
(Continued)

FOREIGN PATENT DOCUMENTS

CN    101998456 A    3/2011
CN    102387524 A    3/2012
(Continued)

OTHER PUBLICATIONS

Search Report and Written Opinion issued by Chinese Patent Office on Nov. 14, 2014.

*Primary Examiner* — Abdelnabi O Musa
(74) *Attorney, Agent, or Firm* — Michael B. Fein; Eckert Seamans Cherin & Mellott, LLC (57) ABSTRACT The present invention provides a method, device and system for maintaining wireless networks, wherein the method includes: an AC receives a wireless access network status parameter fedback by an AP according to a time triggering mode or an event triggering mode; the AC updates the Status Set parameter of the AP locally stored, according to the wireless access network status parameter; the AC updates an event occurrence status parameter of the AP locally stored, according to the updated Status Set parameter and the event update strategy locally stored, wherein the event update (Continued)

strategy refers to an corresponding relationship between the Status Set parameter and the event occurrence status parameter; and the AC maintains the wireless network configuration parameter of the AP according to the updated event occurrence status parameter. By use of the present invention, the problems of a high maintenance cost for artificially maintaining wireless networks and a long maintenance time after a fault occurs are solved, and the stability of the user wireless networks are ensured.

17 Claims, 4 Drawing Sheets

(56) References Cited

U.S. PATENT DOCUMENTS

| | | | | |
|---|---|---|---|---|
| 2013/0028164 | A1* | 1/2013 | Geng | H04W 8/186 370/312 |
| 2014/0092884 | A1* | 4/2014 | Murphy | H04L 41/00 370/338 |
| 2014/0126347 | A1* | 5/2014 | Zhou | H04W 24/04 370/216 |
| 2015/0009901 | A1* | 1/2015 | Gorajala Chandra | H04L 41/0803 370/329 |

FOREIGN PATENT DOCUMENTS

| | | |
|---|---|---|
| CN | 102905299 A | 1/2013 |
| CN | 103096361 A | 5/2013 |
| CN | 103368776 A | 10/2013 |

* cited by examiner

| MAC address of AP1 | MAC address of AP2 | MAC address of AP2 |
|---|---|---|
| Status set parameter of AP | Status set parameter of AP | Status set parameter of AP |
| Attribute#1 | Attribute#1 | Attribute#1 |
| Attribute#2 | Attribute#2 | Attribute#2 |
| Attribute#3 | Attribute#3 | Attribute#3 |
| ... | ... | ... |
| Attribute#N | Attribute#N | Attribute#N |
| configuration parameter of AP | configuration parameter of AP | configuration parameter of AP |
| Parameter#1 | Parameter#1 | Parameter#1 |
| Parameter#2 | Parameter#2 | Parameter#2 |
| Parameter#3 | Parameter#3 | Parameter#3 |
| ... | ... | ... |
| Parameter#N | Parameter#N | Parameter#N |
| general purpose counter of AP | general purpose counter of AP | general purpose counter of AP |
| Counter#1 | Counter#1 | Counter#1 |
| Counter#2 | Counter#2 | Counter#2 |
| ... | ... | ... |
| Counter#N | Counter#N | Counter#N |

METHOD, DEVICE, AND SYSTEMS FOR MANAGING ACCESS POINTS CONTROLLED BY AN ACCESS POINT CONTROLLER

CROSS-REFERENCE TO RELATED APPLICATIONS

This application is the U.S. national stage of PCT/CN2014/076705 filed May 4, 2014, which claims priority from Peoples Republic of China application 201410101877.X filed Mar. 19, 2014, both of which are hereby incorporated by reference.

TECHNICAL FIELD

The present invention relates to communication field, in particular, to a method, device and system for maintaining wireless networks.

BACKGROUND ART

Nowadays internet services increasingly develop, end users render increasingly higher requirements for diversity, stability and reliability of network services. Extensive application of smart phones compel telecommunication operators to provide users with network services which have wider band width, higher performance, more categories, higher security and more reliability. At present, each telecommunication operator commonly enhances network bandwidth, improves network performance and increase network services by expanding WiFi network actively.

As multimedia services increasingly develop, telecommunication operators need to provide users with a WiFi access network having large capacity and large covering area, to process the multimedia services which are bandwidth-dense and real-time. Thereby, the telecommunication operators need to manage hundreds of thousands of wireless access points (APs), and the management manner which the telecommunication operators presently primarily adopt may be a labor management, including the following operation: after the network goes out of order, the users would complain, and then contact network maintenance personnel and the problem is solved by the network maintenance personnel and the network is recovered, etc. The entire procedure may be time-consuming, and since the quantity of APs is large, the cost of maintenance and management will also high, and more workers and larger team of maintenance are needed.

With regard to the problem that there exists high cost and the recovery time after failure is long in the wireless network, an effective solution has not yet been proposed.

DISCLOSURE OF THE UTILITY MODEL

The aim of the present invention is to provide a method, device and system for maintaining wireless networks to solve the above-mentioned problem.

A method for maintaining wireless networks is provided in the embodiment of the present invention, including: an access point controller (AC) receives a wireless access network status parameter fedback by an access point (AP) according to a time triggering mode or an event triggering mode: the AC updates a Status Set parameter of the AP locally stored according to said wireless access network status parameter; the AC updates an event occurrence status parameter according to the updated Status Set parameter and an event update strategy locally stored; wherein the event update strategy indicates corresponding relationship between the Status Set parameter and the event occurrence status parameter; the AC maintains an wireless network configuration parameter of the AP according to the updated event occurrence status parameter.

Preferably, the step that the AC updates the event occurrence status parameter of the AP locally stored according to the updated Status Set parameter and the locally stored event update strategy includes: when the event occurrence status parameter of the AP locally stored by AC is multiple count values of different events, if the updated Status Set parameter satisfies the update of corresponding event in the event update strategy, the AC will add the count value of the corresponding event by 1.

Preferably, the step that the AC maintains the wireless network configuration parameter of the AP according to the updated event occurrence status parameter includes: the AC decides whether it is needed to adjust the wireless network configuration parameter of the AP according to updated event occurrence status parameter and a management strategy preset by a telecommunication operator, wherein if yes, the AC sends a wireless network configuration parameter modification command to the AP, wherein the wireless network configuration parameter modification command carries a new configuration parameter.

Preferably, the aforesaid method further include: the AC receives the wireless network configuration parameter modification command of the AP manually input by an administrator, and the AC sends the wireless network configuration parameter modification command to the AP, wherein the wireless network configuration parameter modification command carries a new configuration parameter.

Preferably, the aforesaid method further include: the AC receives a configuration parameter updated response message (a response message indicating the configuration parameter has been updated), which is fedback by the AP, wherein the configuration parameter updated response message carries the updated configuration parameter of the AP; and the AC updates the configuration parameter of the AP locally stored.

Preferably, the aforesaid communication between the AC and the AP uses Control and Provisioning of Wireless Access Points Protocol Specification CAPWAP.

A device for maintaining wireless network is also provided in the embodiment of the present invention, including: a network status parameter receiving module for receiving a wireless access network status parameter fedback by the AP according to a time triggering mode or an event triggering mode; a Status Set parameter updating module for updating a Status Set parameter of the AP locally stored according to said wireless access network status parameter received by the network status parameter receiving module; an event occurrence status parameter updating module for updating an event occurrence status parameter of the AP locally stored according to the Status Set parameter updated by the Status Set parameter update module and an event update strategy locally stored, wherein the event update strategy refers to a corresponding relationship between the Status Set parameter and the event occurrence status parameter; a wireless network configuration parameter maintenance module used to maintain the wireless network configuration parameter of the AP according to the event occurrence status parameter updated by the event occurrence status parameter updating module.

Preferably, the aforesaid event occurrence status parameter updating module includes: an event count updating unit which is configured such that: when the event occurrence status parameter of the AP locally stored is multiple count values of different events, if the updated Status Set parameter satisfies the update of the corresponding event in the event update strategy, the count value of the corresponding event is added by 1.

Preferably, the aforesaid wireless network configuration parameter maintenance module includes: a deciding unit for deciding whether it is needed to adjust the wireless network configuration parameter of the AP according to the updated event occurrence status parameter and a management strategy preset by a telecommunication operators; a configuration parameter modification unit which is configured such that if the deciding result of the deciding unit is yes, it sends a wireless network configuration parameter modification command to the AP, wherein the wireless network configuration parameter modification command carries a new configuration parameter.

A system for maintaining wireless networks is also provided in the embodiment of the present invention, including an AC and an AP, wherein the AC includes the aforesaid device; the AP is used to feedback the wireless access network status parameter to the AC according to a time triggering mode or an event triggering mode, and when receiving a new configuration parameter sent by the AC, the AP updates its own configuration parameter with a new configuration parameter, and feeds back the updated configuration parameter to the AC.

According to the method, device and system provided by the embodiments of the present invention, the AC updates its Status Set parameter with the wireless access network status parameter fed back by the AP, and updates the event occurrence status parameter of the AP locally stored according to the updated Status Set parameter and the event update strategy locally stored, thereby maintaining the wireless network configuration parameter of the AP, achieving the prompt and dynamical maintenance of the wireless network configuration parameter of the AP according to the AP's objective situation, solving the problem that the maintenance cost of manually maintaining the wireless network is high and the maintenance time is long after failure occurs, thus assuring the stability of user's wireless network.

DETAILED DESCRIPTION OF EMBODIMENTS

The present invention is further described by specific embodiments in conjunction with the attached drawings hereinafter.

Figure 1:
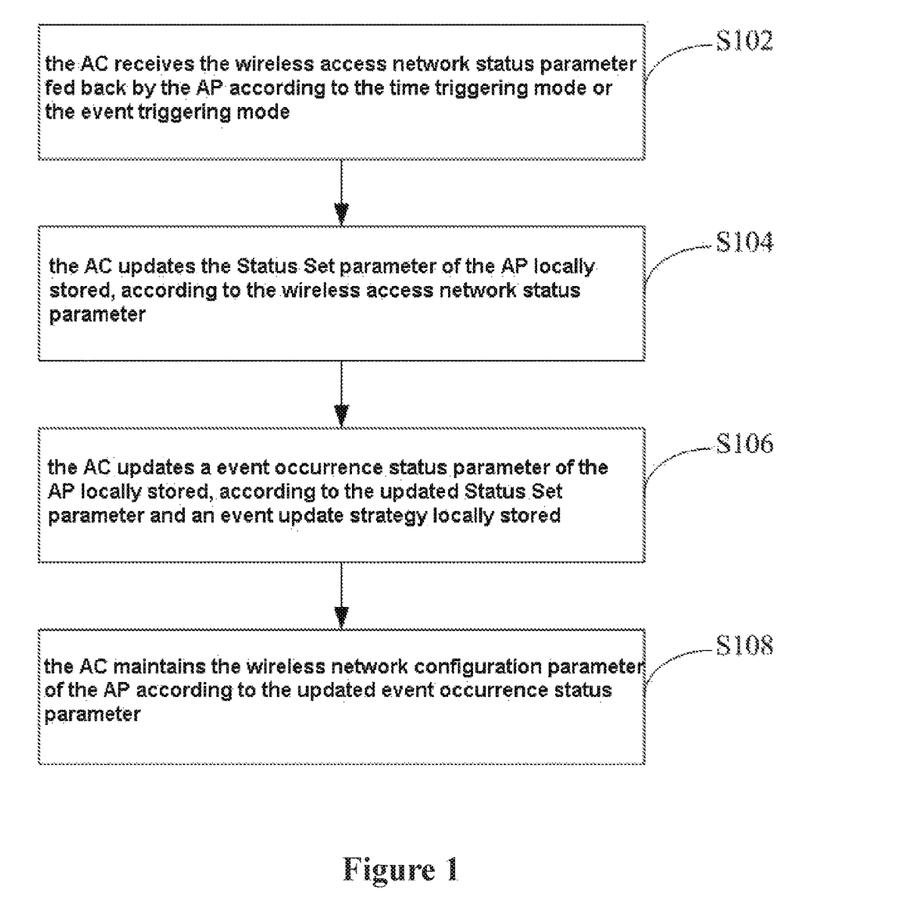
FIG. 1 shows a flow chart of a method for maintaining wireless networks provided by an embodiment of the present invention.

Referencing to the flow chart of the method for maintaining wireless networks shown in FIG. 1, the method is described, for example, explaining from the AC side, the method including the steps of:

Step S102, the AC receives the wireless access network status parameter fed back by the AP according to the time triggering mode or the event triggering mode (for example: the number of access users, the current throughput of the network, etc.), wherein the time triggering mode indicates triggering the aforesaid feedback action when the system clock of the AP reaches a certain time, for example: periodic feedback; the event triggering mode indicates triggering the aforesaid feedback action when the AP finds a certain event occurs, for example, feeding back when receiving the AC's instruction;

Step S104, the AC updates the Status Set parameter of the AP locally stored according to the wireless access network status parameter, wherein one memory area may be established for each AP on the AC to store information related to the AP, and these information may be saved in the same table, or may be distributed in several tables;

Step S106, the AC updates a event occurrence status parameter of the AP locally stored according to the updated Status Set parameter and an event update strategy locally stored, wherein, the event update strategy refers to the corresponding relationship between the aforesaid Status Set parameter and the event occurrence status parameter;

Step S108, the AC maintains the wireless network configuration parameter of the AP according to the updated event occurrence status parameter.

According to the method of the present embodiment, the AC updates its Status Set parameter by the wireless access network status parameter fed back by the AP, and updates the event occurrence status parameter of the AP locally stored according to the updated Status Set parameter and the event update strategy locally stored, thereby maintaining the wireless network configuration parameter of the AP, achieving the prompt and dynamical maintenance of the wireless network configuration parameter of the AP according to the AP's objective situation, solving the problem that the maintenance cost of manually maintaining the wireless network is high and the maintenance time is long after failure occurs, thus assuring the stability of user's wireless network.

In the embodiment of the present invention, the aforesaid event occurrence status parameter may be a counter for each event. Based on this, that the aforesaid AC updates the event occurrence status parameter of the AP locally stored according to the updated Status Set parameter and the event update strategy locally stored includes: when the event occurrence status parameters of the AP locally stored may be multiple count values for different event, if the updated Status Set parameter satisfies the update of the corresponding event in the event update strategy, then the AC will add the count value of the corresponding event by 1.

Particularly, that the aforesaid AC maintains the wireless network configuration parameter of the AP according to the updated event occurrence status parameter includes: the AC decides whether it is needed to adjust the wireless network configuration parameter of the AP according to the updated event occurrence status parameter and the management strategy preset by the telecommunication operator, wherein if yes, the AC will sends a wireless network configuration parameter modification command to the AP, wherein the wireless networks configuration parameter modification command carries a new configuration parameter. In this manner, the automatic sending of the AP's configuration parameter may be achieved, thereby realizing the timely modification of the AP's configuration parameter, ensuring normal operation of the AP.

Considering that sometimes the administrator needs to manually adjust the configuration parameter of a certain AP, the aforesaid method also includes: the AC receives a wireless network configuration parameter modification command of the AP manually input by the administrator, and the AC sends the wireless network configuration parameter modification command to the AP, wherein the wireless network configuration parameter modification command carries a new configuration parameter.

In order to enable the AC to know whether the AP updates the configuration parameter, the aforesaid method also includes: the AC receives a configuration parameter updated response message fedback by the AP, wherein the configuration parameter updated response message carries the AP-updated configuration parameter; the AC updates the configuration parameter of the AP locally stored. In this manner, the AC side always keeps synchronizing with the configuration parameter of AP side, facilitating the reasonable maintenance to the AP.

The communication between the AC and the AP uses Control and Provisioning of Wireless Access Points Protocol Specification (CAPWAP).

Upon actual implementation, in the embodiment of the present invention, a set of CMA wireless access network management software is provided on the AC, wherein the software can automatically modify the wireless AP configuration parameter according to current wireless access network information parameter reported by wireless access point AP managed by the AC and according to preset network management strategy. Automatic, intelligent wireless network management can be achieved, and the network management cost of the network distributor may be greatly reduced. At the same time, this software platform will not be dependent on a specific hardware and operation system.

The CMA wireless access network management software of the present embodiment may be established on the multi-core and multithreading embedded processor array, up-to-date intelligent distributed computation construction. it is designed to concurrently manage two hundreds thousands of access points, and may satisfy the increasingly harsh management demand on telecommunication operators-level large-scale wireless access network, and provide a intelligent network management platform of high efficiency.

The CMA wireless access network management software has the object design of automatically and intellectually managing wireless networks. The CMA is developed based on the current thin AP and AC construction and the CAPWAP (RFC5415, RFC5416) of international standard. The network status parameters fedback periodically by the wireless access points can be recorded, stored, and analyzed by the CMA wireless access network management software. At the same time, the network configuration parameter is adjusted and the network is optimized intelligently and automatically, according to the network control strategy preset by the network telecommunication operators.

Figure 2:
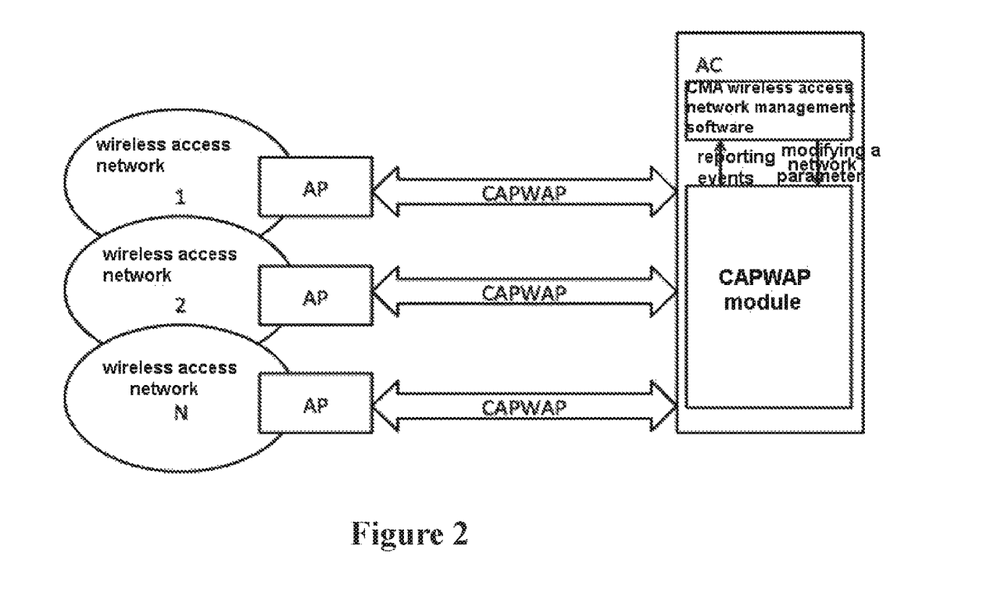
FIG. 2 shows a schematic view of application scene of a method for maintaining wireless networks provided by an embodiment of the present invention.

Referring to the application scene schematic diagram of the method for maintaining wireless networks shown in FIG. 2, the wireless access network in the figure establishes a link to the AC by the AP, and under the application scene, the AP and the AC are linked through the CAPWAP protocol and establish the wireless access network and begins to serve for the users according to the initialization configuration of the AC. Each AP sends current AP configuration information to the CMA through the CAPWAP tunnel after the establishment of the access network is completed. The CMA stores the information. Each wireless access network AP periodically feedbacks the wireless access network status parameters (such as the number of access users, the current network throughput, the current network background noise etc.). After received by the CAPWAP module of the AC, these network status parameters, as an event, is sent to the CMA wireless access management software. Here, the CMA wireless access network management software automatically updates the status information of each AP according to the event information reported, and concurrently updates the occurrence status of the special event according to the event update strategy set by the telecommunication operator and the AP's status parameter. Subsequently, the CMA wireless access network management software periodically invokes the wireless network management strategy set by the telecommunication operator, and determines whether to adjust the parameter of the AP and how to adjust the parameter according to current status parameter of the AP and the current occurrence status of the special event of the AP. After deciding to adjust the parameter, the CMA wireless access network management software pushes the command to the CAPWAP module, and the command is sent by the CAPWAP module to the object AP for the configuration modification. After the completion of the modification, the object AP returns the execution result to the CMA through the CAPWAP, and the CMA wireless access network management software updates the stored configuration information of the object AP according to the returned execution result.

Figure 3:
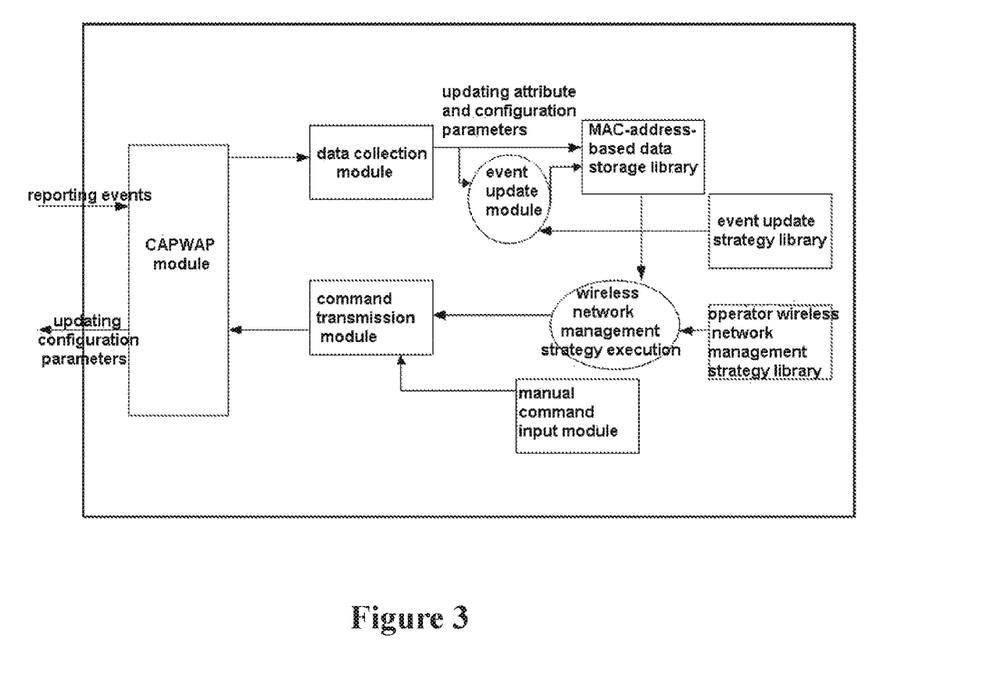
FIG. 3 shows a schematic view of the AC's internal structure provided by an embodiment of the present invention.

Corresponding to the application scene in FIG. 2, the embodiment of the present invention provides a division method of the AC internal structure. As shown in the diagram of the AC internal structure in FIG. 3, the AC includes: a CAPWAP module to receive and transmit data, a data collection module, a event update module, a event update policy library, a MAC-based recording database, a telecommunication operator wireless network management strategy library (Action Policy), a wireless network management strategy execution (Policy Execution Core), a manual command input and command transmission module (Action Delivery), wherein the remaining modules, except the CAPWAP module, correspond to the aforesaid CMA wireless access network management software. The functions of each module will be described below:

(1) a data collection module: receiving and processing the information reported by the AP, wherein the character string information reported by the AP is used to determine the AP status register corresponding to the information through the key search technology, and the numerical value of the AP status register is automatically updated, and the numerical value is transmitted to a MAC-address-based data storage library for preservation.

(2) an event update module: updating the AP event register with the AP status information output by the data collection module according to the event update strategy obtained from the event update strategy library, and the numerical value is transmitted to the data storage library based on the MAC address for preservation.

(3) an event update strategy library: used to store the event update strategy set by telecommunication operators, wherein criterion standards of various events as well as update algorithms of various event counters are defined in the event update strategy. Telecommunication operators may read and assign in the strategy the counter of the AP's General Counters, and read the values of the AP's Status Set parameter as well as AP Configuration parameter. (To be noted: the event counter herein is the AP General Counters).

Figure 4:
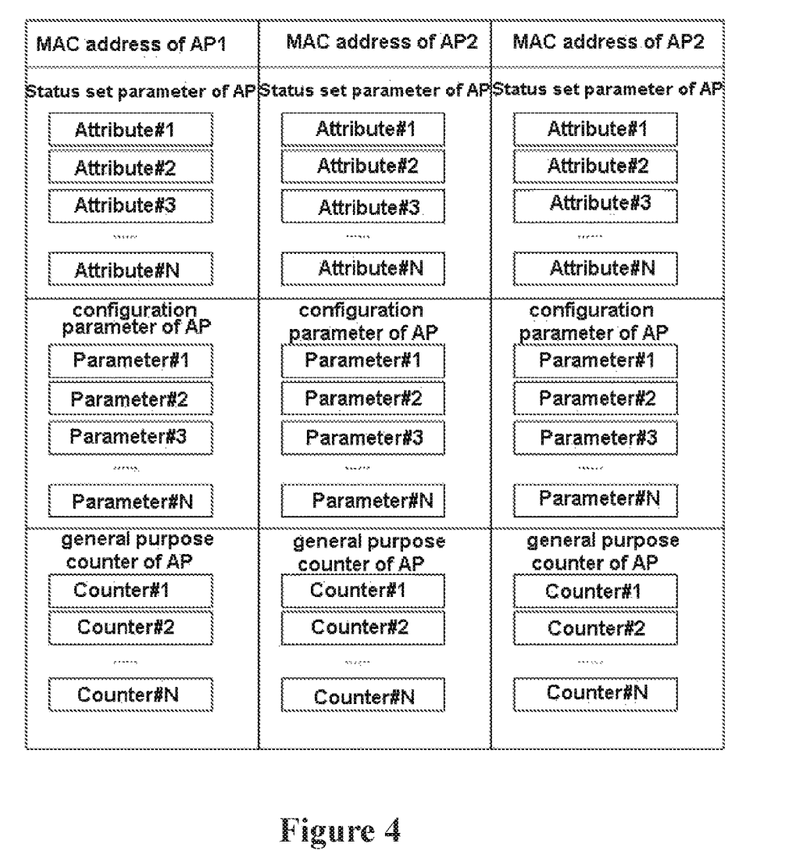
FIG. 4 shows a schematic view of the detailed design structure of a MAC address-based data storage library provided by an embodiment of the present invention.

(4) a MAC-address-based data storage library: used to store the status information and the configuration parameter information for each AP as well as the AP's event information. The detailed design structure of the MAC address-based data storage library is shown in FIG. 4, wherein the configuration information, the status information as well as the event information (event message) of the AP are classified according to the corresponding AP, and differentiated based on the AP's MAC address, wherein the status information of the AP is stored in the Status Set parameter of the AP; the configuration information of the AP is stored in the configuration parameter of the AP; the event information and the other register information used for the wireless network management strategy is stored in a general purpose counter of the AP, wherein the Status Set parameter of the AP is automatically updated according to the information reported by the AP; the configuration parameter of the AP is automatically updated through the configuration information reported at a initial stage of the AP and the configuration feedback information after the AP modifies the configuration; the general purpose counter of the AP is updated according to the event update strategy set by the telecommunication operators, based on the AP's Status Set parameter reported by the AP; meanwhile, the modification may also be performed according to the strategy when the CMA wireless network management software carries out the wireless network management strategy set by telecommunication operators.

Meanwhile, each counter has a broad sense design of a counter, namely the meaning of each counter is uncertain, and the telecommunication operators may freely design the counter to store different information for use. For example, Attribute #1 of the Status Set parameter of the AP may be stored as the number of users associated with the current AP, and may also be stored as the current AP's throughput. Thereby, a better expansion may be provided for the strategy of telecommunication operators.

(5) a telecommunication operator wireless network management strategy library: used to store the wireless network management strategy set by the telecommunication operators, wherein the wireless network management strategy determine which configurations of the AP to be modified according to the current status information, the configuration information and the event message of the AP. Telecommunication operators may read and assign the count value of the AP's general purpose counter in the strategy, and read the values of the AP's Status Set parameter as well as the AP's Configuration parameter.

(6) a wireless network management strategy execution module: used to periodically read the stored telecommunication operator wireless network management strategy from the telecommunication operator wireless network management strategy library, and to execute according to the wireless network management strategy, and to send to the command transmission module the configuration modification command made based on the telecommunication operator wireless network management strategy.

(7) a manual command input module: used to allow the administrator to input timely the configuration modification command to the object AP to configure for the object AP in the manually-managing manner. The module would input the configuration modification command to the command transmission module.

(8) a command transmission module: enclosing the received modification command into a proper CAPWAP information element, and delivering it to the CAPWAP module for sending to the object AP.

Upon specific implementation, the data interacted between the AP and the AC may be realized by employing the following message format:

The AP may periodically update its own status information (namely the aforesaid wireless access network status parameter) towards the AC, through a Event Report Request message of the CAPWAP, employing the manufacturer self-defined IE format. The specific format is designed as follows:

| 1 Byte | 1 Byte | 1 Byte | 1 Byte |
| --- | --- | --- | --- |
| Vendor Identifier Element ID Sub Element ID Configuration String | | Length Configuration String | |

In the above, the space of Vendor Identifier is to be filled in with the enterprise number registered by the first party corporation;

the space of Element ID is to be filled in with a serial number assigned for the CMA wireless access network management software by the first party corporation;

the space of Length is to be filled in with the follow-up length of the message, including Sub Element ID and Configuration String, with the unit of byte;

the space of Sub Element ID is to be filled in with a ID number assigned for the information reported message of the AP by the first party corporation.

The current status information and the string format of the AP is carried in Configuration String, the specific format of which is as follows:

"AP's MAC, A1=XX, A2=XX, A3=XX, A7=XX, A10=XX";

The content carried by Configuration String is a variable, and needs to be filled in by the AP according to its own condition, wherein the AP's MAC is the MAC address of the AP for the WAN port, which is used to identify the AP, and A1=a key character which is used to label the Attribute corresponding to the subsequent value. The AP determines the carried information character according to the information scope reported by itself, and key characters may be sorted according to the ascending order.

The AP would send the Event Report Request message in the following scene:

1. The AP sends according to the preset period the Event Report Request Message to the AC, and synchronizes its own configuration information to the CMA wireless access network management software on the AC;

2. The AP sends the WTP Configuration Update Response message to the AC after the configuration modification command sent by AC has been executed, and updates its own configuration information to the CMA wireless access network management software on the AC.

The WTP Configuration Update Response message is in the manufacturer-defined IE format, the specific format of which is designed as follows:

| 1 Byte | 1 Byte | 1 Byte | 1 Byte |
| --- | --- | --- | --- |
| Vendor Identifier Element ID Sub Element ID Configuration String | | Length Configuration String | |

In the above, the space of Vendor Identifier is filled in with the enterprise number registered by the first party corporation;

the space of Element ID is filled in with a serial number assigned for the CMA wireless access network management software by the first party corporation;

the space of Length is filled in with the follow-up length of the message, including Sub Element ID and Configuration String, with the unit of byte;

the space of Sub Element ID is filled in with the ID number assigned for the AP configuration message by the first party corporation.

The current status information of the AP and the string format are carried in Configuration String, the specific format of which is as follows:

"AP's MAC, P1=XX, P2=XX, P3=XX, P7=XX, P10=XX";

The content carried by Configuration String is a variable, and needs to be filled in by the AP according to its own condition, wherein the AP's MAC is the MAC address of the AP for the WAN port, which is used to identify AP, P1=a key character which is used to label the configuration parameter corresponding to the subsequent value. The AP determines the carried information character according to the information scope reported by itself, and key characters need to be sorted according to the ascending order.

The aforesaid method may also involve that the AC sends the wireless network configuration parameter modification command to the AP, and the command may be implemented by employing the CMA command transmission message. Particularly, the AC sends the configuration modification command through sending the WTP Configuration Update Request message to the object AP. The major format is as follows:

| 1 Byte | 1 Byte | 1 Byte | 1 Byte |
|---|---|---|---|
| Vendor Identifier Element ID Sub Element ID Configuration String | | Length Configuration String | |

In the above, the space of Vendor Identifier is filled in with the enterprise number registered by the first party corporation;

the space of Element ID is filled in with a serial number assigned for the CMA system by the first party corporation;

the space of Length is filled in with the follow-up length of the message, including Sub Element ID and Configuration String, with the unit of byte;

the space of Sub Element ID is to be filled in with the ID number assigned for the CMA command transmission message by the first party corporation.

The AP's new configuration parameter and string format are carried in Configuration String, the specific content of which may be established by the AP's manufacturer and telecommunication operators themselves.

Figure 5:
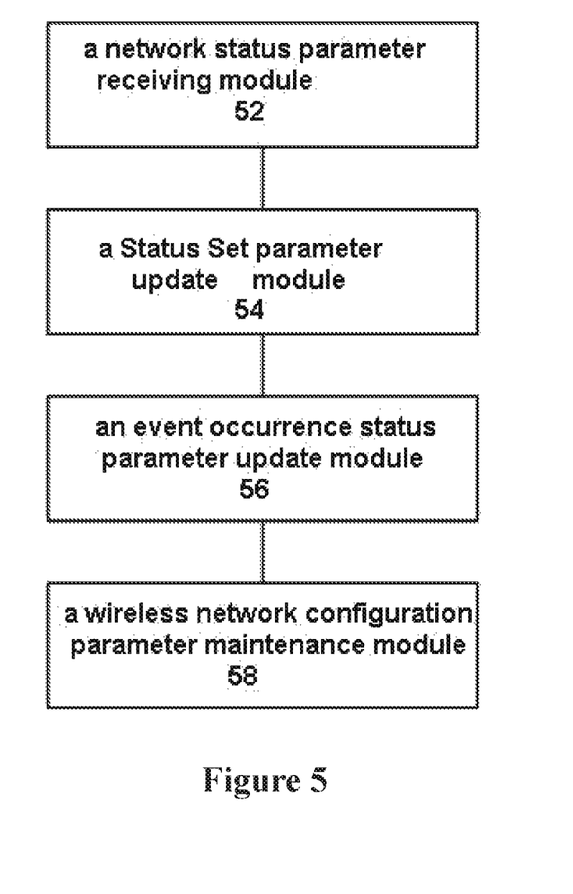
FIG. 5 shows a structure block diagram of a device for maintaining wireless networks provided by an embodiment of the present invention.

Corresponding to the aforesaid method, the embodiment of the present invention may also provide a device for maintaining wireless network, and the device may be provided on the AC, referring to FIG. 5, the device including the following modules:

a network status parameter receiving module 52, used to receive the wireless access network status parameter which the access point AP feedbacks according to the time or event triggering mode;

a Status Set parameter update module 54, used to update the Status Set parameter of the AP locally stored according to the wireless access network status parameter received by the aforesaid network status parameter receiving module 52;

an event occurrence status parameter update module 56, used to update the event occurrence status parameter of the AP locally stored according to the Status Set parameter updated by the aforesaid Status Set parameter update module 54 and the event update strategy locally stored, wherein the event update strategy refers to the corresponding relationship between the Status Set parameter and the event occurrence status parameter; and a wireless network configuration parameter maintenance module 58, used to maintain the wireless network configuration parameter of the AP according to the event occurrence status parameter updated by the aforesaid event occurrence status parameter update module 56.

In the device of the present embodiment, it updates its Status Set parameter by the wireless access network status parameter fed back by the AP, and updates the event occurrence status parameter of the AP locally stored according to the updated Status Set parameter and the event update strategy locally stored, thereby maintaining the wireless network configuration parameter of the AP, achieving maintaining the wireless network configuration parameter of the AP promptly and dynamically according to the AP's objective situation, solving the problem that the maintenance cost of the manual maintenance of the wireless network is high and the maintenance time is long after failure occurs, thus assuring the stability of user's wireless network.

Preferably, the aforesaid event occurrence status parameter update module 56 includes: an event count update unit used to add by 1 the count value of corresponding event, if the updated Status Set parameter satisfies the update of the corresponding event in the event update strategy, when the event occurrence status parameter of the AP locally stored is the count values for multiple different events.

The aforesaid wireless network configuration parameter maintenance module 58 may include: a deciding unit used to decide whether it is needed to adjust the wireless network configuration parameter of the AP according to the updated event occurrence status parameter and the management strategy preset by the telecommunication operators; a configuration parameter modification unit used to send the wireless network configuration parameter modification command to the AP if the decision result of the deciding result is yes, wherein the wireless network configuration parameter modification command may carries a new configuration parameter.

Corresponding to the aforesaid method and device, the embodiment of the present invention also provides a wireless network maintenance system, including an AC and an AP, wherein the AC includes the aforesaid device; the AP is used to feedback the wireless access network status parameter to the AC according to the time triggering mode or the event triggering mode, and when the new configuration parameter sent by the AC is received, the AP's own configuration parameter is updated using the new configuration parameter, and feedback the updated configuration parameter to the AC.

The above embodiments, based on the current thin construction of the AP and the AC are performed based on the CAPWAP protocol (RFC5415, RFC5416) of the international standard, and the information between the AP and AC is transmitted using the CAPWAP, the mode of which is merely a embodiment. Upon specific implementation, the present invention is not limited to the CAPWAP, and the aforesaid solution may be established on the communication tunnel between the other ACs and APs.

In the aforesaid embodiments, the network status parameter periodically fedback by the each wireless access points may be recorded, stored, and analyzed by the AC. Meanwhile, according to the network control strategy preset by the network telecommunication operators, the network configuration parameter is adjusted, and the network is automatically intelligently optimized, which greatly reduces the telecommunication operator network maintenance cost, and can find the failure and maintain the network at the beginning stage of a network failure, thereby accelerating the response to the failure.

Apparently, it should be understood by the skilled person in the art that each module or each step in the aforesaid invention may be implemented with a universal computing device, and may be integrated on a single computing device or be distributed in the network composed of multiple computing devices. Preferably, they may be implemented by the computing device executable code, thereby they may be stored in the storage device to be executed by the computing device, or may be separately manufactured into each integrated circuit module, or multiple modules or steps among them may be implemented by being manufactured into a single integrated circuit module. Thus, the present invention is not limited to any specific combination of hardware and software.

The above content may merely be the preferable embodiments of the present invention, and not used to limit the present invention, and various modifications and changes may be made to the present invention for the skilled person in the art. Any modifications, substitutions and improvements in the spirit and principle of present invention should be covered by the scope of the present invention.

The invention claimed is:

1. A method for maintaining wireless networks, characterized by including:
   an access point controller (AC) receives a wireless access network status parameter fedback by an access point (AP) according to a time triggering mode or an event triggering mode;
   the AC updates a Status Set parameter of the AP locally stored, according to the wireless access network status parameter;
   the AC updates an event occurrence status parameter of the AP locally stored, according to the updated Status Set parameter and an event update strategy locally stored, wherein the event update strategy refers to a corresponding relationship between the Status Set parameter and the event occurrence status parameter; and
   the AC maintains the wireless network configuration parameter of the AP according to the updated event occurrence status parameter;
   wherein the AC decides whether it is needed to adjust the wireless network configuration parameter of the AP according to the updated event occurrence status parameter and a management strategy preset by telecommunication operators, and
   wherein when yes, the AC sends a wireless network configuration parameter modification command to the AP, wherein the wireless network configuration parameter modification command carries a new configuration parameter.

2. The method of claim 1, characterized in that the step that the AC updates the event occurrence status parameter of the AP locally stored according to the updated Status Set parameter and the event update strategy locally stored includes:
   when the event occurrence status parameter of the AP locally stored by AC is count values for multiple different events when the updated Status Set parameter satisfies the update of an corresponding event in the event update strategy, the AC adds the count value of the corresponding event by 1.

3. The method of claim 2, characterized in that the communication between the AC and the AP employs a CAPWAP (Control and Provisioning of Wireless Access Points Protocol Specification).

4. The method of claim 1, characterized in that the method further includes:
   the AC receives a wireless network configuration parameter modification command of the AP manually input by an administrator, and the AC sends the wireless network configuration parameter modification command to the AP, wherein the wireless network configuration parameter modification command carries a new configuration parameter.

5. The method of claim 4, characterized in that the method further includes:
   the AC receives a configuration parameter updated response message fedback by the AP, wherein the configuration parameter updated response message carries the configuration parameter updated by the AP; and
   the AC updates the configuration parameter of the AP locally stored.

6. The method of claim 4, characterized in that the communication between the AC and the AP employs a CAPWAP (Control and Provisioning of Wireless Access Points Protocol Specification).

7. The method of claim 1, characterized in that the method further includes:
   the AC receives a configuration parameter updated response message fedback by the AP, wherein the configuration parameter updated response message carries the configuration parameter updated by the AP; and
   the AC updates the configuration parameter of the AP locally stored.

8. The method of claim 7, characterized in that the communication between the AC and the AP employs a CAPWAP (Control and Provisioning of Wireless Access Points Protocol Specification).

9. The method of claim 1, characterized in that the communication between the AC and the AP employs a CAPWAP (Control and Provisioning of Wireless Access Points Protocol Specification).

10. The method of claim 1, characterized in that the communication between the AC and the AP employs a CAPWAP (Control and Provisioning of Wireless Access Points Protocol Specification).

11. The method for maintaining wireless networks of claim 1 wherein the access point controller (AC) receives a wireless access network status parameter feedback by an access point (AP) according to a periodic time triggering mode.

12. The method for maintaining wireless networks of claim 1 wherein the access point controller (AC) receives a wireless access network status parameter feedback by an access point (AP) according to an event triggering mode.

13. A system for maintaining wireless networks, characterized by including
a memory connected to a processor:
a network status parameter receiving module, used to receive a wireless access network status parameter which an access point AP feedbacks according to a time triggering mode or an event triggering mode;
a Status Set parameter update module, used to update the Status Set parameter of the AP locally stored according to the wireless access network status parameter received by the aforesaid network status parameter receiving module;
an event occurrence status parameter update module, used to update the event occurrence status parameter of the AP locally stored, according to the Status Set parameter updated by the Status Set parameter update module and an event update strategy locally stored, wherein the event update strategy refers to an corresponding relationship between the Status Set parameter and the event occurrence status parameter;
a wireless network configuration parameter maintenance module, used to maintain the wireless network configuration parameter of the AP according to the event occurrence status parameter updated by the event occurrence status parameter update module, the wireless network configuration parameter maintenance module further includes:
a deciding unit, used to decide whether it is needed to adjust the wireless network configuration parameter of the AP according to the updated event occurrence status parameter and a management strategy preset by telecommunication operators; and
a configuration parameter modification unit, used to send a wireless network configuration parameter modification command to the AP when the deciding result of the deciding unit is yes, wherein the wireless network configuration parameter modification command carries a new configuration parameter.

14. The system of claim 13, characterized in that the event occurrence status parameter update module includes:
an event count update unit, used to add the count value of a corresponding event by 1 when the updated Status Set parameter satisfies the update of the corresponding event in the event update strategy, when the event occurrence status parameter of the AP locally stored is count values for multiple different events.

15. The system of claim 14 wherein
the AP is used to feedback the wireless access network status parameter to the AC according to the time triggering mode or the event triggering mode, and when a new configuration parameter sent by the AC is received, the AP uses the new configuration parameter to update its own configuration parameter and feedback the updated configuration parameter to the AC.

16. The system of claim 13 wherein
the AP is used to feedback the wireless access network status parameter to the AC according to the time triggering mode or the event triggering mode, and when a new configuration parameter sent by the AC is received, the AP uses the new configuration parameter to update its own configuration parameter and fedback the updated configuration parameter to the AC.

17. The system of claim 13 wherein
the AP is used to feedback the wireless access network status parameter to the AC according to the time triggering mode or the event triggering mode, and when a new configuration parameter sent by the AC is received, the AP uses the new configuration parameter to update its own configuration parameter and feedback the updated configuration parameter to the AC.

* * * * *

UNITED STATES PATENT AND TRADEMARK OFFICE
CERTIFICATE OF CORRECTION

PATENT NO. : 9,654,995 B2  
APPLICATION NO. : 14/421076  
DATED : May 16, 2017  
INVENTOR(S) : Fang Wu et al.

Page 1 of 1

It is certified that error appears in the above-identified patent and that said Letters Patent is hereby corrected as shown below:

On the Title Page (72) Inventors should read:

(72) Inventors: Fang Wu, Chengdu (CN);
Yongcheng Lei, Chengdu (CN);
Jiangang Ding, Chengdu (CN);
Jingli Chi, Chengdu (CN);
Feng Lin, Chengdu (CN)

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*